(12) United States Patent
Behrendt et al.

(10) Patent No.: US 9,687,763 B2
(45) Date of Patent: Jun. 27, 2017

(54) MAGNETIC FILTER MEDIUM AND METHOD FOR ITS PRODUCTION

(71) Applicant: MANN+HUMMEL GMBH, Ludwigsburg (DE)

(72) Inventors: Nico Behrendt, Wolfsburg (DE); Anton Kreiner, Reisbach (DE); Bjoern Schmid, Stuttgart (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 121 days.

(21) Appl. No.: 14/224,089

(22) Filed: Mar. 25, 2014

(65) Prior Publication Data

US 2014/0291222 A1 Oct. 2, 2014

(30) Foreign Application Priority Data

Mar. 27, 2013 (DE) .................... 10 2013 005 232

(51) Int. Cl.
*B01D 35/06* (2006.01)
*B01D 39/18* (2006.01)
*B32B 37/12* (2006.01)
*B01D 39/16* (2006.01)

(52) U.S. Cl.
CPC ......... *B01D 35/06* (2013.01); *B01D 39/1607* (2013.01); *B01D 39/18* (2013.01); *B32B 37/12* (2013.01); *B01D 2239/025* (2013.01); *B01D 2239/04* (2013.01); *B01D 2239/083* (2013.01); *B32B 2037/1215* (2013.01); *B32B 2305/10* (2013.01); *B32B 2307/208* (2013.01); *Y10T 156/10* (2015.01)

(58) Field of Classification Search
CPC .... B01D 35/06; B01D 39/18; B01D 39/1607; B01D 2239/025; B01D 2239/083; B01D 2239/04; B01D 39/16; B01D 39/1615; B01D 39/1623; B01D 2239/0258; B01D 2239/0407; B01D 2239/0471; B01D 2239/0478; B01D 2239/0485; B01D 2239/086; B32B 37/12; B32B 2305/10; B32B 2037/1215; B32B 2307/208; Y10T 156/10; B03C 1/30
See application file for complete search history.

(56) References Cited

U.S. PATENT DOCUMENTS

| 4,309,290 A | | 1/1982 | Heitkamp | |
|---|---|---|---|---|
| 4,645,597 A | * | 2/1987 | Wada | B01D 29/111 210/222 |
| 4,650,506 A | * | 3/1987 | Barris | B01D 39/1623 210/505 |

(Continued)

FOREIGN PATENT DOCUMENTS

| GB | 840291 A | * | 7/1960 | ............. B01D 29/21 |
|---|---|---|---|---|
| JP | 2009-6272 A | * | 1/2009 | |

OTHER PUBLICATIONS

English language machine translation of JP 2009-006272, Accessed Jun. 6, 2016, pp. 1-20.*

*Primary Examiner* — David C Mellon
(74) *Attorney, Agent, or Firm* — James Hasselbeck

(57) ABSTRACT

A filter medium for removing metallic particles, in particular for liquid filtration, is provided. The filter medium is comprised of a substrate, an adhesive layer containing magnetic particles applied onto the substrate, and at least one nanofiber layer arranged on the adhesive layer.

12 Claims, 3 Drawing Sheets

(56) References Cited

U.S. PATENT DOCUMENTS

| | | | | |
|---|---|---|---|---|
| 5,536,784 A | * | 7/1996 | Mao | C08F 283/00 |
| | | | | 525/154 |
| 5,821,297 A | * | 10/1998 | Arnold | C09J 123/0853 |
| | | | | 524/296 |
| 6,217,505 B1 | * | 4/2001 | Sakuma | A61N 2/00 |
| | | | | 600/15 |
| 6,461,504 B1 | * | 10/2002 | Bolser | B01D 27/00 |
| | | | | 156/325 |
| 2010/0181249 A1 | * | 7/2010 | Green | B01D 39/1623 |
| | | | | 210/493.1 |
| 2010/0319113 A1 | * | 12/2010 | Rock | A62D 5/00 |
| | | | | 2/457 |
| 2013/0206683 A1 | | 8/2013 | Behrendt et al. | |
| 2014/0014573 A1 | * | 1/2014 | Hosoya | B32B 5/26 |
| | | | | 210/491 |

* cited by examiner

MAGNETIC FILTER MEDIUM AND METHOD FOR ITS PRODUCTION

CROSS-REFERENCE TO RELATED APPLICATION

This application claims the benefit of German patent application No. 10 2013 005 232.7, filed Mar. 27, 2013, the entire contents of the aforesaid German patent application being incorporated herein by reference.

TECHNICAL FIELD

The present invention concerns filter media in general. In particular, the invention concerns those filter media that contain magnetic particles. Moreover, the invention concerns a method for producing such filter media that contain fibers.

BACKGROUND

In industry, it is often necessary to remove magnetic particles from liquids such as e.g. motor oils, cooling liquids, water/drinking water, fuels, pumping liquids, hydraulic liquids, electrolytic wastewater, and the like. For example, US 2010012567A1, CN2758494Y, and US2005205 481 A1 disclose the use of magnets in compact form for separation of iron particles from motor oils. In addition, magnet arrangements are often used in order to remove rust particles, as disclosed e.g. in US2010065504A1.

Many of the industrial filter devices that are frequently of a multi-step configuration also have in addition a magnetic or electromagnetic separator in order to remove magnetic particles from the exhaust gas, as disclosed e.g. in US2005241484A1.

Removal of metallic or ferritic particles from wastewater of various origin has also been reported several times, for example, in WO2008101352A1.

CN201362630Y discloses a method for removal of heavy metals from wastewater wherein magnetic effects are being used also.

In further publications, the typical magnetic arrangements in the form of compact rods or plates have been abandoned. For example, in CN101733965A ferrites that are enveloped by silicone as "core-shell" systems are disclosed, and active carbon loaded with ferrites is known from US2010155335A1.

In the environmental field/water protection, separation methods that are based on magnetic effects are also used already, For example, CN101708881A discloses a method for removing blue green algae from bodies of waters in which first a magnetic flocculent is added which adheres to the blue green algae. In this way, it is possible to remove the "magnetized" blue green algae from the water by means of magnets.

It is known to produce ultra-thin fibers (so-called nanofibers, i.e., fibers with a fiber diameter of mostly (99.9%) in a range of <500 nm) by the so-called electrospinning method. The electrospinning method (also referred to as electrostatic spinning) is a versatile method in order to produce from solutions and melts, primarily of polymers, continuous fibers with diameters of a few millimeters to a few nanometers. The method is versatile regarding uses because almost all soluble and meltable polymers can be used, the polymers moreover can be furnished also with different additives, from simple soot particles to complex species such as enzymes, viruses, and bacteria, and, of course, chemical modifications are possible also.

In the proper meaning, the electrospinning process is not a fiber spinning method but instead is a method of coating with microfiber or nanofiber nonwovens. By electrospinning, it is thus possible to coat almost any solid and liquid substrates with a thin layer of polymer fiber nonwoven that typically have a weight per surface area of <1 g/cm². Such electrospun polymer fiber nonwovens are of a pronounced delicate structure and can essentially be used only on substrates. By a significant increase of the productivity of the electrospinning method, self-supporting electrospun fabrics are now accessible also that have significantly higher weights per surface area (up to 200 g/cm²) and thus can no longer be viewed as coatings. The nanofiber filters that are produced in this way exhibit a high filtration efficiency.

In his dissertation (Herstellung wasserfester funktionaler Nanofasern durch Elektrospinnen wässriger Formulierungen [translation: Manufacture of water-resistant functional nanofibers by electrospinning of aqueous formulations], Philipps Universität Marburg, 2009), Röcker discloses the manufacture of nanofibers with a ferritic magnet particles. However, the manufacture of nanofibers that have magnetic particles as additives is very complex. On the one hand, for this purpose only very small ferrite particles can be employed; on the other hand, these particles do not uniformly distribute in the nanofibers. Moreover, in case of large-scale technical production there is the problem of deposition of ferrite particles on iron parts, for example, the wire electrodes for spraying the nanofibers; this prevents an effective coating action.

Therefore, tests have been carried out (Max von Bistram; Strukturierte funktionelle Nanofasern durch Elektrospinnen [translation: Structured functional nanofibers by electrospinning], dissertation, Philipps-Universität Marburg, 2007) to produce magnetic particles in situ. For this purpose, polyacrylonitrile (PAN) solutions, for example, were spun that contain iron-III- and optionally iron-II-ions, for example, in the form of iron-III-nitrate, Mohr's salt or complex compounds such as iron-III-acetylacetonates. The disadvantage of such an approach is that only relatively poisonous solvents can be employed for the spinning solution. Also, the iron-III-compounds must be subsequently decomposed thermally to the appropriate magnetic compounds such as $Fe_3O_4$ or $\gamma$-$Fe_2O_3$. As disclosed in Bistram, in doing so, the PAN fibers are also decomposed to pure carbon fibers, i.e., carbonized. However, carbonization produces poisonous hydrocyanic acid. Also, in case of introduction of ferrites into fine fibers/nanofibers there is the risk of washing out the ferrites because the diameters of the ferrite particles is often larger than the diameters of the fibers.

Therefore, there is a need for a magnetic filter medium or a method for its manufacture with which the aforementioned disadvantages of the prior art can be overcome.

SUMMARY OF THE INVENTION

It is therefore the object of the present invention to make available a filter medium for removal of metal particles from fluids that does not have the aforementioned disadvantages. Moreover, it is an object of the present invention to make available a method for producing such a filter medium.

These and further objects are solved by the filter medium according to claims presented herein.

In a special embodiment of the invention, said fiber layer is a polymer fiber nonwoven, a natural fiber nonwoven, or a cellulose substrate. For example, the fiber layer is a meltblown or spunbond nonwoven.

In a preferred embodiment of the invention, said fiber layer is a nanofiber layer.

In a special embodiment of the invention, the substrate is a polymer fiber nonwoven.

In a preferred embodiment of the invention, the magnetic particles in the temperature range of use of the filter medium have ferromagnetic properties.

In an advantageous further embodiment, the magnetic particles are present in powder form wherein the particles have a particle size distribution in the range of 0.1 to 700 µm.

In a preferred embodiment of the invention, the magnetic particles are comprised of ferrite.

In a preferred manner, the adhesive layer is made of a hotmelt or of a reactive adhesive.

Also in accordance with the invention, the reactive adhesive is comprised of an aqueous dispersion, preferably of polyurethane and polyacrylic esters.

In a preferred embodiment of the invention, the filter medium comprises at least two fiber layers, especially nanofiber layers, with different fiber diameters that are arranged on the adhesive layer.

In a preferred manner, the fibers, especially nanofibers, are made of polyamide and contain in addition suitable additives.

In a special embodiment of the invention, the adhesive layer is applied on both sides onto the substrate.

Also in accordance with the invention, the substrate is coated on both sides with at least one fiber layer, especially one nanofiber layer.

In a preferred embodiment of the invention, when introducing the magnetic particles into the adhesive, mixing takes place.

The filter element according to the invention can be in particular used for treating electrolytic wastewater or sludge, in water/drink drinking water treatment, and in EDM (electrical discharge machining) applications.

BRIEF DESCRIPTION OF THE DRAWINGS

The invention will be explained in the following in more detail with the aid of the drawings. It is shown in.

DETAILED DESCRIPTION OF THE INVENTION

Figure 1:
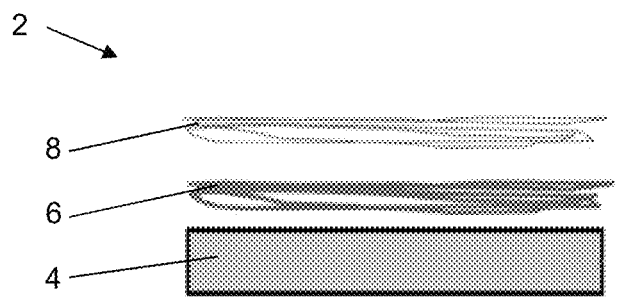
FIG. 1 schematically the configuration of a filter medium coated with nanofibers according to the prior art.

The invention is based on the idea of combining the known good filtration efficiency of nanofibers with magnetic separation effects in order to separate particularly effectively magnetic metal particles that are formed e.g. in eroding processes.

For this purpose, a filter medium is used in which on a substrate a magnetic particle-containing adhesive layer is applied and this adhesive layer is coated with at least one fiber layer. For example the fiber layer is a meltblown or spunbond nonwoven. Especially the fiber layer is a nanofiber layer. The substrate can be e.g. a polymer fiber nonwoven, a natural fiber nonwoven or a cellulose substrate. The employed adhesive material can be a hotmelt adhesive (hotmelt), 2- or multi-component adhesive or a reactive adhesive wherein the reactive adhesive may be comprised e.g. of an aqueous dispersion. Reactive adhesives are adhesive materials which, over time, will cross-link and form a chemical network, mainly due to the presence of moisture in the air (reactive polyurethanes or polyolefins) as well as adhesive materials that form in the dry state a network, and therefore more a physical one (for example, acrylate dispersions). An example of an aqueous dispersion is the Akrylep 417E adhesive of the company Lear which is comprised of polyurethane and polyacrylic esters.

For the magnetic separation effect, magnetic particles are used which are in particular in powder form, e.g. strontium ferrite. Particularly advantageous is the use of a ferrite powder wherein the particle size distribution is in the range of 0.1 to 700 µm. The magnetic particles are either sprinkled onto the adhesive layer or are admixed with the adhesive which has the advantage that no sedimentation occurs during sprinkling. Subsequently, the adhesive layer provided with the magnetic particles is applied onto the substrate. Also possible is a two-sided coating of the substrate with the mixture of adhesive and magnetic particles so that a higher application is possible.

Subsequently, the substrate is coated with at least one layer of nanofibers. The nanofibers are comprised preferably of polyamide but can also be produced of other materials. The nanofibers are preferably produced by electrospinning wherein from solutions or melts, preferably of polymers, continuous fibers with diameters of a few millimeters to a few nanometers can be produced. The fibers can be made of all suitable polymers, including thermoplastic and thermoset polymers. Suitable polymers for producing nanofibers comprise, for example, but are not limited to, polyamide, aliphatic polyamide, aromatic polyamide, polysulfone, cellulose acetate, polyethersulfone, polyurethane, polyurea urethane, polybenzimidazole, polyetherimide, polyacrylonitrile, polyethylene terephthalate, polypropylene, polyaniline, polyethylene oxide, polyethylene naphthalate, polybutylene terephthalate, styrene butadiene rubber, polystyrene, polyvinyl chloride, polyvinyl alcohol, polyvinylidene fluoride, polyvinyl butylene, copolymers or derived compounds and combinations thereof.

The filter medium which is produced in this way is thus comprised of a substrate, an adhesive layer with magnetic particles applied to the substrate, and at least one layer of nanofibers.

In a particular embodiment of the filter medium according to the invention, the substrate with the applied adhesive layer is coated with two or more nanofiber layers which have different fiber diameters or fineness. Advantages of a different layering can be optimized pressure losses and/or optimized dust capacities. For example, a layer of thick nanofibers (fiber diameters approximately 240 nm) followed by a layer of thin nanofibers (fiber diameter approximately 90 nm) can be applied onto the adhesive layer. In general, fiber diameters in a range between 50 nm and 800 nm can be used in combination. Reverse layering is possible also.

In addition to the good filtration efficiency of the nanofibers, the filter medium according to the invention has also good magnetic separation effects due to the use of magnetic particles. The problem known from the prior art of the magnetic particles being washed out when introduced into nanofibers or fine fibers due to the fact that diameters of the magnetic particles are often greater than the diameters of the fibers (compare dissertation Röcker and dissertation by Bistram) is circumvented by introducing the magnetic particles into the adhesive layer according to the invention. After binding of the adhesive, the magnetic particles are fixedly embedded in the adhesive matrix and can therefore not be washed out.

In the following, an embodiment of the method according to the invention is provided. In this context, so-called EDM (electrical discharge machining) media were used that are water-resistant.

As magnetic particles, strontium ferrite powder of the type No. 15 of the company Tridelta was used. This is a hard ferritic material which is permanently magnetic. As a hotmelt the product 614.18 of the company Jowat AG was used. 25 g of the ferrite powder was premixed with 75 g of the hotmelt. The mixture was melted to 200° C., thoroughly mixed with each other, and subsequently cooled to room temperature. The hotmelt ferrite mixture was then applied at a melting temperature of 145° C. by means of a nozzle system. The nozzle diameter was 1 mm. The substrate was uniformly coated in this way with the modified hotmelt so that a hotmelt layer of approximately 25 g/m$^2$ was produced. The fiber diameter of the hotmelt filaments was on average approximately 0.3 mm. A polypropylene melt-blown was selected as a coating substrate.

The polypropylene nonwoven which was provided with the hotmelt ferrite mixture was subsequently provided with a first nanofiber layer of 0.5 g/m$^2$. The average fiber diameter was 240 nm. Subsequently, the medium was provided with a second layer of nanofibers. The applied material of this layer was 0.1 g/m$^2$ and the average fiber diameter 90 nm.

For reference purposes, also a polypropylene melt-blown medium was provided. The latter was however not coated with a ferrite-containing hotmelt layer but only with a first nanofiber layer (0.5 g/m$^2$) whose average fiber diameter was 240 nm and a second nanofiber layer (0.1 g/m$^2$) whose average fiber diameter was 90 nm.

For the spinning tests, a lab spinning device of the company Elmarco (NS Lab 500) was used. The distance between wire and counter electrodes was 170 mm. The coating rate was generally 10 Hz (0.26 m/min) at an electrode voltage of 80 KV, the amperage approximately 0.016 mA and the electrode speed 38 Hz (6.1 rpm). The humidity was 58% r.h. at 22° C.

The production of the nanofibers with the diameter of 240 nm was done with the following formulation:
  16% polyamide (BASF Ultramid B24)
  28% formic acid (99%)
  55% acetic acid (96%)

The production of the nanofibers with the diameter of 90 nm was done with the following formulation:
  14% polyamide (BASF Ultramid B24)
  29% formic acid (99.9%)
  57% acetic acid (96%).

Measurement and Comparison of the Filtration Efficiency

FIG. 1 shows schematically the configuration of the reference sample 2 of polypropylene melt-blown substrate 4 with a first layer 6 of nanofibers with a fiber diameter of 240 nm deposited thereon and a second nanofiber layer 8 with a fiber diameter of 90 nm.

Figure 2:
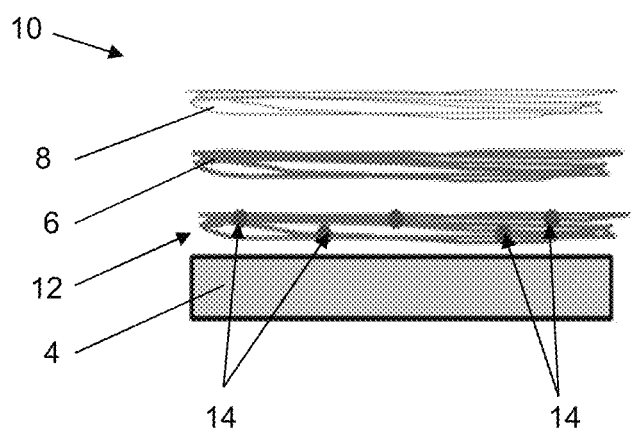
FIG. 2 schematically the configuration of a filter medium according to the invention.

FIG. 2 shows schematically the configuration of the sample 10 according to the invention of a polypropylene melt-blown substrate 4 with a hotmelt ferrite layer 12 applied thereon, a first layer 6 of nanofibers with a fiber diameter of 240 nm deposited thereon, and a second nanofiber layer 8 with a fiber diameter of 90 nm.

On an EDM testing apparatus a standardized steel material of the type X210CrW12 with the dimensions of width×length×thickness=100×400×66 mm was eroded. The eroding removal rate was 120 mm$^2$/min. The produced particles were taken up with water and at a rate of 17.5 l/h passed through a surface of 528 cm$^2$ of the filter medium to be tested. The turbidity (NTU, nephelometric turbidity unit) was measured according to ISO 7027 (scattered light measurement 90° angle, wavelength 860 nm).

Since turbidity is caused by the EDM particles, the decrease of the turbidity is a measure for the success of filtration.

Recorded was the pressure increase in bar across the running time in hours as well as the decrease of turbidity, also across the running time in hours.

The following Table 1 shows a comparison of the pressure increase for reference sample and sample according to the invention,

TABLE 1

| time [hours] | pressure increase reference [bar] | pressure increase invention [bar] |
|---|---|---|
| 9 | 0.98 | 0.42 |
| 12 | 1.29 | 0.76 |
| 14 | 1.49 | 0.98 |
| 16.5 | 1.74 | 1.26 |
| 18 | 1.89 | 1.42 |
| 19 | 2.00 | 1.53 |
| 22 | 2.30 | 1.87 |
| 23 | 2.40 | 1.98 |

Figure 4:
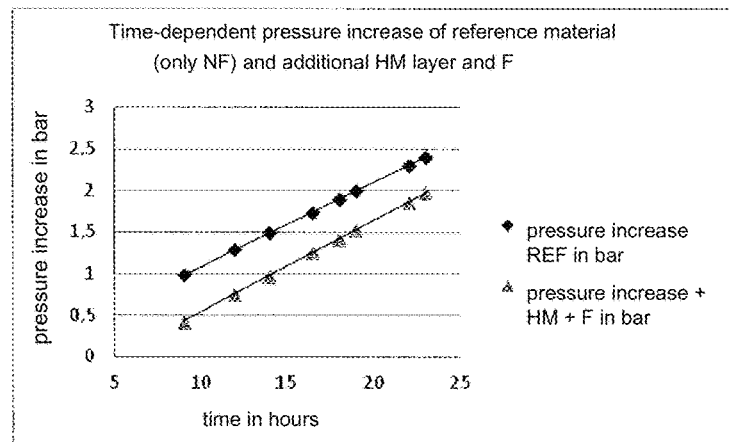
FIG. 4 an exemplary graph of time-dependent pressure increase of reference material (only NF) and additional HM layer and F.

The diagram of FIG. 4 illustrates the results of Table 1 (REF=reference material; HM=hot melt; F=fibers).

The following Table 2 shows a comparison of the turbidity courses for reference sample and sample according to the invention.

TABLE 2

| time [hours] | turbidity reference [NTU] | turbidity invention [NTU] |
|---|---|---|
| 0 | 0.98 | 0.42 |
| 0.25 | 1.29 | 0.76 |
| 1 | 1.49 | 0.98 |
| 1.5 | 1.74 | 1.26 |
| 3 | 1.89 | 1.42 |
| 22 | 2.00 | 1.53 |

Figure 5:
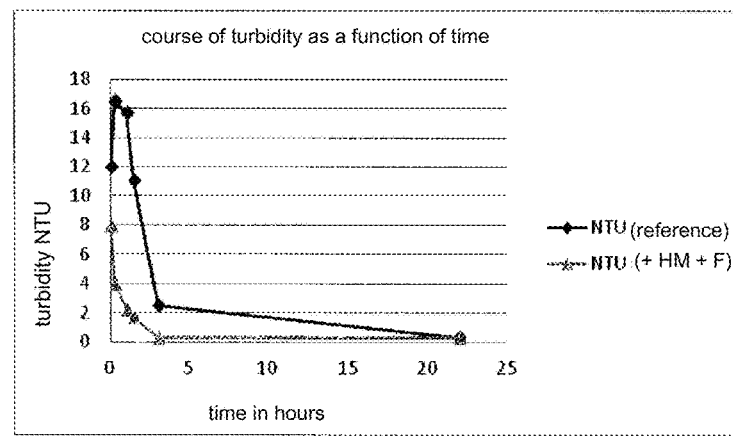
FIG. 5 an exemplary graph of the course of turbidity as a function of time.

The diagram of FIG. 5 illustrates the results of the Table 2 (HM=hotmelt; F=fibers).

The embodiment demonstrates that introducing the adhesive (hotmelt) with magnetic particles leads to a significantly faster drop of turbidity; also, the pressure increase is lower. The adhesive layer is used for introducing magnetic particles in order to separate metallic particles more effectively without them possibly being carried away by the fluid to be filtered.

It is apparent to a person of skill in the art that the nanofibers can be optimized for the respective application, for example, with regard to water sensitivity, by using known additives.

Figure 3:
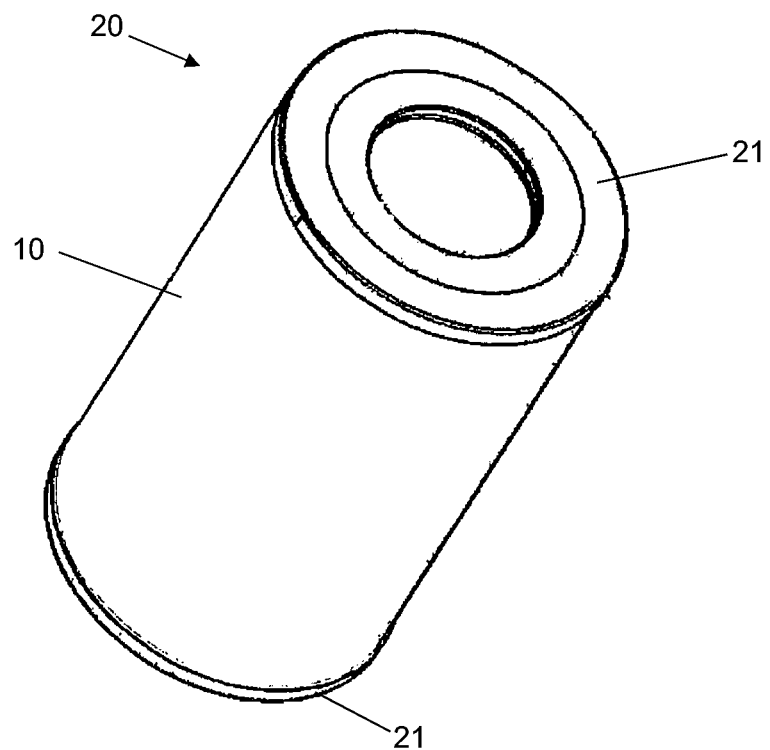
FIG. 3 a possible application of the filter medium according to the invention.

The filter medium according to the invention can be used in particular for liquid filtration, for example, for removal of iron and other metallic particles from motor oil. FIG. 3 shows such a possible use of the filter medium 10 according to the invention as a round filter 20 in which the filter medium 10 is folded in a star shape, for example. On the end faces, the folded filter medium 10 is sealed e.g. by end discs 21.

A further possible application lies in the field of electrical discharge machining (EDM). In eroding processes metal particles with a high iron proportion are released which oxidize quickly to iron oxide hydroxide. These magnetic iron oxide hydroxide particles can be removed well by use of the invention. Additional cost savings result because the media that have been employed up to now can be replaced by less expensive media.

A further possible application is opened up in case of treatment of electrolytic wastewater and sludges, e.g. in processing of the anode sludge in copper refining for separation of the magnetic particles and passage of the noble metals. In the treatment of red mud contaminated wastewater, the magnetic iron hydroxides and oxides, containing also heavy metals such as e.g. Hg, Cr, and Pb, can be separated.

Finally, the invention can also be used for water or drinking water treatment for separating rust particles which otherwise would cause a reddish brown color of the water and deposit within the conduit network.

The invention claimed is:

1. A filter element for filtering a fluid and removing metallic particles from the fluid being filtered, the filter element comprising:
    a substrate layer configured to be flowed thorough by the fluid to be filtered, the substrate layer selected from the group consisting of: a nonwoven polymer fiber layer, a non-woven natural fiber layer, and a cellulose layer;
    an adhesive layer configured to be flowed thorough by the fluid to be filtered, the adhesive layer containing magnetic ferrite particles having ferromagnetic properties, the magnetic ferrite particles fixedly embedded into adhesive of the adhesive layer, the adhesive layer arranged directly on an upstream side of the substrate layer;
    a first fiber layer as a first nanofiber layer configured to be flowed thorough by the fluid to be filtered, the first nanofiber layer arranged on an upstream side of the adhesive layer, such that the adhesive layer and magnetic ferrite particles are sandwiched between the substrate layer and the first nanofiber layer;
    wherein the metallic particles of the fluid entering through the first nanofiber layer are captured by the magnetic ferrite particles of the adhesive layer and thereby removed from the fluid flowing though the filter medium;
    wherein the substrate layer, adhesive layer and first nanofiber layer together circumferentially close about a hollow interior of the filter element.

2. The filter element according to claim 1, wherein the filter element is a round filter element circumferentially closed about the hollow interior of the filter element.

3. The filter element according to claim 1, wherein the filter medium comprises a second fiber layer arranged directly on the first nanofiber layer;
    wherein the second fiber layer is a layer of thick nanofibers having fiber diameters greater than fiber diameters of the first nanofiber layer.

4. The filter element according to claim 3, wherein the first nanofiber layer and the second fiber layer have fiber diameters in a range between 50 nm and 800 nm.

5. The filter element according to claim 1, wherein fibers of the first nanofiber layer are selected from the set consisting of:
    polyamide, aliphatic polyamide, aromatic polyamide, polysulfone, cellulose acetate, polyethersulfone, polyurethane, polyurea urethane, polybenzimidazole, polyetherimide, polyacrylonitrile, polyethylene terephthalate, polypropylene, polyaniline, polyethylene oxide, polyethylene naphthalate, polybutylene terephthalate, styrene butadiene rubber, polystyrene, polyvinyl chloride, polyvinyl alcohol, polyvinylidene fluoride, and polyvinyl butylene.

6. The filter element according to claim 1, wherein the filter medium of the filter element is folded into a star shape.

7. The filter element according to claim 1, wherein the magnetic ferrite particles are present in powder form and wherein the magnetic particles have a particle size distribution in the range of 0.1 to 700μm.

8. The filter element according to claim 1, wherein the adhesive layer is a hotmelt adhesive.

9. The filter element according to claim 1, wherein the adhesive layer is comprised of a reactive adhesive;
    wherein the reactive adhesive is comprised of an aqueous dispersion of polyurethane and polyacrylic esters.

10. The filter element according to claim 1, wherein the first fiber layer comprises polyamide fibers.

11. The filter element according to claim 1, wherein said first nanofiber layer selected from the set consisting of:
    a polymer fiber nonwoven; and
    a natural fiber nonwoven.

12. The filter element according to claim 1, wherein the filter medium is configured for removing metallic particles from fluids in electrical discharge machining, operable for reducing erosion in eroding processes, in treating electrolytic wastewater and sludges, or in water/drinking water treatment.

* * * * *